United States Patent
Drescher

(10) Patent No.: US 8,205,949 B2
(45) Date of Patent: Jun. 26, 2012

(54) ANTI-LOCK HYDRAULIC BRAKING SYSTEM, IN PARTICULAR FOR MOTORIZED TWO-WHEEL VEHICLES

(75) Inventor: Walter Drescher, Ebern (DE)

(73) Assignee: FTE automotive GmbH, Ebern (DE)

( * ) Notice: Subject to any disclaimer, the term of this patent is extended or adjusted under 35 U.S.C. 154(b) by 1029 days.

(21) Appl. No.: 12/079,299

(22) Filed: Mar. 26, 2008

(65) Prior Publication Data
US 2008/0246334 A1 Oct. 9, 2008

(30) Foreign Application Priority Data
Apr. 5, 2007 (DE) .................. 10 2007 016 948

(51) Int. Cl.
*B60T 8/42* (2006.01)
(52) U.S. Cl. ................... 303/115.4; 303/115.2
(58) Field of Classification Search .......... 303/137, 303/113.1, 113.2, 115.1, 115.2, 115.4, 115.5, 303/116.1, 116.2, 116.3, 119.1
See application file for complete search history.

(56) References Cited

U.S. PATENT DOCUMENTS

| | | | |
|---|---|---|---|
| 4,099,793 A | 7/1978 | Ito | |
| 4,793,138 A * | 12/1988 | Baumgartner | 60/491 |
| 5,152,589 A | 10/1992 | Ocvirk | |
| 5,255,963 A | 10/1993 | Altmann et al. | |
| 5,271,667 A * | 12/1993 | Takata et al. | 303/113.2 |
| 5,374,112 A * | 12/1994 | Takata et al. | 303/113.2 |
| 5,484,194 A * | 1/1996 | Reinartz et al. | 303/116.2 |
| 5,743,601 A * | 4/1998 | Mori et al. | 303/187 |
| 6,074,018 A | 6/2000 | Zeiner et al. | |
| 6,082,830 A * | 7/2000 | Volz et al. | 303/113.4 |
| 6,113,197 A * | 9/2000 | Kuroki et al. | 303/11 |
| 6,206,482 B1 * | 3/2001 | Campau et al. | 303/20 |
| 6,688,707 B1 * | 2/2004 | Dinkel et al. | 303/119.3 |

FOREIGN PATENT DOCUMENTS

| | | |
|---|---|---|
| DE | 36 31 442 A1 | 3/1988 |
| DE | 40 28 552 A1 | 3/1992 |
| DE | 40 39 088 A1 | 6/1992 |
| EP | 0 253 157 A1 | 1/1988 |
| JP | 60025835 A | 2/1985 |
| JP | 61113545 A | 5/1986 |
| WO | WO 94/07719 A1 | 4/1994 |
| WO | WO 97/04999 A1 | 2/1997 |

OTHER PUBLICATIONS

Machine translation of DE 40 28 552 obtained from espacenet.org.*
European Search Report—No. EP 08 00 2704 dated Aug. 10, 2010, 9 pages.

* cited by examiner

*Primary Examiner* — Bradley King
*Assistant Examiner* — Nicholas J Lane
(74) *Attorney, Agent, or Firm* — Reising Ethington P.C.

(57) ABSTRACT

An anti-lock hydraulic braking system has a wheel brake circuit with a main brake cylinder, wheel brake cylinder and switching valve, and an auxiliary pressure circuit, connected in parallel between the switching valve and wheel brake cylinder on the wheel brake circuit. With ABS control, the switching valve can be switched from a basic position, where it hydraulically connects the main brake cylinder and wheel brake cylinder, to a switched position where it prevents a build-up of braking pressure on the wheel brake cylinder via the main brake cylinder, while the braking pressure on the wheel brake cylinder can be modulated by the auxiliary pressure circuit.

10 Claims, 2 Drawing Sheets

ANTI-LOCK HYDRAULIC BRAKING SYSTEM, IN PARTICULAR FOR MOTORIZED TWO-WHEEL VEHICLES

TECHNICAL FIELD

The invention relates to an anti-lock hydraulic braking system. In particular, the invention relates to an anti-lock hydraulic braking system for motorized two-wheel vehicles, as recently demanded by transport experts for safety reasons in general for motorized two-wheel vehicles.

An anti-lock system, generally also known as an anti-lock braking system (ABS), in principle ensures that when, during a braking process with a braking pressure occurring on the wheel brake cylinder, a certain slowing threshold on the braked wheel is exceeded so that the wheel threatens to lock, the wheel braking pressure is reduced to below a second slowing threshold on this wheel. For this, it may be necessary to reduce the wheel braking pressure to zero. Thereafter, the wheel braking pressure is increased again until either the wheel is excessively braked again or the braking pressure defined by the driver is reached.

PRIOR ART

In the prior art, there is no lack of suggestions as to how the above-described braking pressure modulation can be achieved. For example, DE 40 10 841 A1 discloses an anti-lock hydraulic braking system which comprises a wheel brake circuit and an auxiliary pressure circuit. The wheel brake circuit comprises a main cylinder, a wheel brake and an inlet valve arranged therebetween. The auxiliary pressure circuit is connected in parallel between the inlet valve and the wheel brake on the wheel brake circuit. Here, an auxiliary pressure pump divides the auxiliary pressure circuit into a return line on the pump input side and an auxiliary pressure line on the pump output side. Arranged one behind the other in the flow direction in the return line are an electromagnetically operated outlet valve, which is closed without current in its basic position, and a pressure medium reservoir which acts as a low-pressure reservoir, while a throttle is arranged in the auxiliary pressure line.

In the case of ABS control, the inlet valve can be switched by means of the auxiliary pressure in front of the throttle in the auxiliary pressure line from an open basic position into a switched position in which it interrupts the hydraulic connection between the main cylinder and the wheel brake. The braking pressure on the wheel brake can then be modulated in a suitable manner, while the auxiliary pressure pump continues to run, by the cooperation of the throttle in the auxiliary pressure line with a "phase control" of the outlet valve in the return line.

Although the above-described braking system is advantageously free of feedback on account in particular of the blocking effect of the inlet valve in the case of ABS control, i.e. the ABS pressure control shocks caused by the switching processes of the outlet valve are not transmitted to the main cylinder and thus the brake pedal, it is considered to be a disadvantage of this prior art that a relatively high device complexity is required which prevents the use of such a braking system in particular in inexpensive two-wheel vehicles.

Furthermore, DE 40 39 088 A1 discloses an anti-lock hydraulic braking system based on the return principle, in which a volume equalization device in the form of a low-pressure reservoir is hydraulically connected to a line section between a hydraulic pump and a throttle device.

Finally, DE 196 44 883 A1 discloses a vehicle braking system with a traction and/or driving dynamics control device, in which at least two hydraulic pumps are driven by means of a controllable-speed electric motor, wherein the volume flow discharged by the hydraulic pumps can be varied by changing the speed of the electric motor. In this prior art, too, a volume equalization device is provided which is arranged downstream of the hydraulic pumps in front of a throttle and has the function, as part of a pulse-reducing device consisting of the throttle and a buffer chamber, of equalizing the pressure fluctuations coming from the hydraulic pumps.

OBJECT

The object of the invention is to provide an anti-lock hydraulic braking system, in particular for motorized two-wheel vehicles, which is simpler and less expensive than the above prior art and which, in the case of ABS control, is essentially free of disruptive feedback effects on the main brake cylinder.

SUMMARY OF THE INVENTION

According to the invention, an anti-lock hydraulic braking system, in particular for motorized two-wheel vehicles, includes a wheel brake circuit which has a main brake cylinder, at least one wheel brake cylinder and a switching valve. An auxiliary pressure circuit is connected in parallel between the switching valve and the wheel brake cylinder on the wheel brake circuit. The auxiliary pressure circuit has a hydraulic pump for producing a volume flow, a throttle device arranged downstream of the hydraulic pump, and also a volume equalization device. The switching valve, for a skid-controlled operating phase of the braking system, can be switched from a basic position, in which it hydraulically connects the main brake cylinder and the wheel brake cylinder, to a switched position in which it prevents a build-up of braking pressure on the wheel brake cylinder via the main brake cylinder, while the braking pressure on the wheel brake cylinder can be modulated by means of the auxiliary pressure circuit. The volume equalization device is connected between the hydraulic pump and the throttle device on the auxiliary pressure circuit, wherein the hydraulic pump can vary the volume flow in order to withdraw hydraulic fluid from the wheel brake circuit in a defined manner.

The hydraulic braking system designed in this way is firstly characterized in that it manages entirely without any electromagnetically operated switching valves for the pressure modulation in the skid-controlled operating phase. Compared to the prior art, this construction not only lowers the costs of the braking system as a whole but also advantageously reduces the size and weight of the actual pressure modulator. The hydraulic braking system according to the invention is thus particularly recommended for use on smaller or lower-performance motorized two-wheel vehicles, for example on scooters.

Instead of using electromagnetically operated switching valves, the dynamics of the hydraulic pump are used for pressure modulation in the anti-lock operating phase of the hydraulic braking system according to the invention, in that a greater or lesser volume of hydraulic fluid is withdrawn from the wheel brake circuit by changing the conveying power of the hydraulic pump in a defined manner, wherein the hydraulic pump can at the same time provide the volume equalization device with the volume of hydraulic fluid withdrawn from the wheel brake circuit, which builds up pressure in front of the throttle device. In this case, a larger volume of hydraulic fluid can be withdrawn from the wheel brake circuit by a relatively high conveying power of the hydraulic pump, which leads to a greater pressure drop in the wheel brake circuit, while a smaller volume of hydraulic fluid can be withdrawn from the wheel brake circuit by a relatively low conveying power of the hydraulic pump, which leads to a smaller pressure drop in the wheel brake circuit. In order to build up pressure in the wheel brake circuit, all that is required is to reduce the conveying power of the hydraulic pump until the hydraulic pressure in the line section between the hydraulic pump and the throttle device is reduced far enough that the volume equalization device at least partially discharges again the volume of hydraulic fluid that has been withdrawn from the wheel brake circuit, which then passes back into the wheel brake circuit via the throttle device in a time-delayed manner.

In other words, according to the invention, the hydraulic pump performs two functions: on the one hand it conveys in a defined manner a volume of hydraulic fluid out of the wheel brake circuit, which cannot pass back into the wheel brake circuit due to the throttle device; on the other hand it produces a dynamic pressure in front of the throttle device, as a result of which the volume equalization device receives a volume of hydraulic fluid, i.e. stores it for a subsequent or time-delayed discharge at a time of considerably reduced conveying power of the hydraulic pump. Of course, all of this requires that the volume flow produced by the hydraulic pump, or the conveying power thereof, can be varied with a suitable sensitivity and timeliness, so that the hydraulic pressure in the wheel brake circuit can be reduced, maintained or increased as described in a defined manner by suitably actuating the hydraulic pump in collaboration with the throttle device and the volume equalization device. The actual ABS control algorithm, with predefined pressure increase, pressure maintenance and pressure reduction phases, need not differ from the conventional ABS control algorithms; however, the pressure modulation is brought about in a different way that has been simplified in device terms compared to the prior art.

Since no electromagnetically operated switching valves are used, but instead the hydraulic pump can be operated continuously—but with a varying volume flow discharge—in the skid-controlled operating phase of the hydraulic braking system according to the invention, there are also no pressure control shocks which could have a feedback effect on the main brake cylinder, so that the braking system according to the invention is essentially free of feedback.

Preferably, the volume equalization device is a spring pressure reservoir. These reservoirs have a characteristic that can easily be set via the spring force and are easily commercially available at a low price as a mass-produced part.

It is also preferred if the throttle device used is a fixed baffle, the characteristic of which, unlike the characteristic of a fixed throttle, is essentially independent of the viscosity and thus the temperature of the hydraulic medium due to the throughflow length of the fixed baffle which is only short.

Although there are in principle different possibilities for changing the conveying volume of the hydraulic pump, it is preferred in particular for cost reasons and with regard to easy control to drive the hydraulic pump by means of an electric motor, the rotational speed of which can be controlled in order to vary the volume flow produced by the hydraulic pump. The hydraulic pump may in principle be any motor-driven oil pump, e.g. a gear pump. However, with regard to high pressure resistance, low costs and a small size, preference is given to the use of a roller cell pump. The electric motor for driving the pump is preferably a brushless DC motor, which is characterized by excellent dynamics, a high efficiency, low wear and thus a long service life, a good overload capacity, a low weight and, last but not least, low noise generation.

With regard to the preferably hydraulic switching signal for the switching valve, this can be tapped off between the main brake cylinder and the switching valve on the wheel brake circuit, by a hydraulic control line connected there which leads to a control connection of the switching valve. However, preference is given to an embodiment in which the switching valve can be switched from its basic position into its switched position as a function of the pressure prevailing between the hydraulic pump and the throttle device in the auxiliary pressure circuit, by a hydraulic control line or a hydraulic control channel which is connected between the hydraulic pump and the throttle device on the auxiliary pressure circuit and leads to the control connection of the switching valve. In this case, the switching valve is advantageously switched from its basic position into its switched position only when the hydraulic pump is operating correctly.

In principle, it is possible to configure the switching valve—as in the above prior art—in such a way that the switching valve in its switched position interrupts, i.e. blocks, the connection between the main brake cylinder and the wheel brake cylinder in both possible flow directions. However, it is preferred if the switching valve is designed in such a way that the switching valve in its switched position acts as a non-return valve which allows a reduction in braking pressure on the wheel brake cylinder via the main brake cylinder. On the one hand, the switching valve thus switched into its switched position therefore prevents any more pressure from being added to the wheel brake circuit via the main brake cylinder in the case of ABS control. On the other hand, however, the switching valve thus switched into its switched position makes it possible to take account of a driver's desired pressure decrease, i.e. the driver in the case of ABS control on the main brake cylinder reduces the actuating force and opens the switching valve located in its switched position, which leads to pressure relief in the wheel brake circuit section between the switching valve and the wheel brake cylinder.

A pressure sensor may also be provided, by means of which the braking pressure in the wheel brake circuit can be detected. On the one hand, the quality of control can be improved by such a pressure detection. On the other hand, it is thus easily possible to prevent a negative pressure from being generated on the wheel brake cylinder due to the suction effect of the hydraulic pump.

Finally, advantageously at least the switching valve, the hydraulic pump, the throttle device and the volume equalization device are combined to form a block as pressure modulator. Such a pressure modulator may be provided as a pre-assembled, functionally checked unit which has optionally been pre-filled with hydraulic fluid, for uncomplicated installation by the motor vehicle manufacturer.

BRIEF DESCRIPTION OF THE DRAWINGS

The invention will be explained in more detail below on the basis of preferred examples of embodiments and with reference to the appended schematic drawings. In the drawings.

DETAILED DESCRIPTION OF THE EXAMPLES OF EMBODIMENTS

Figure 1:
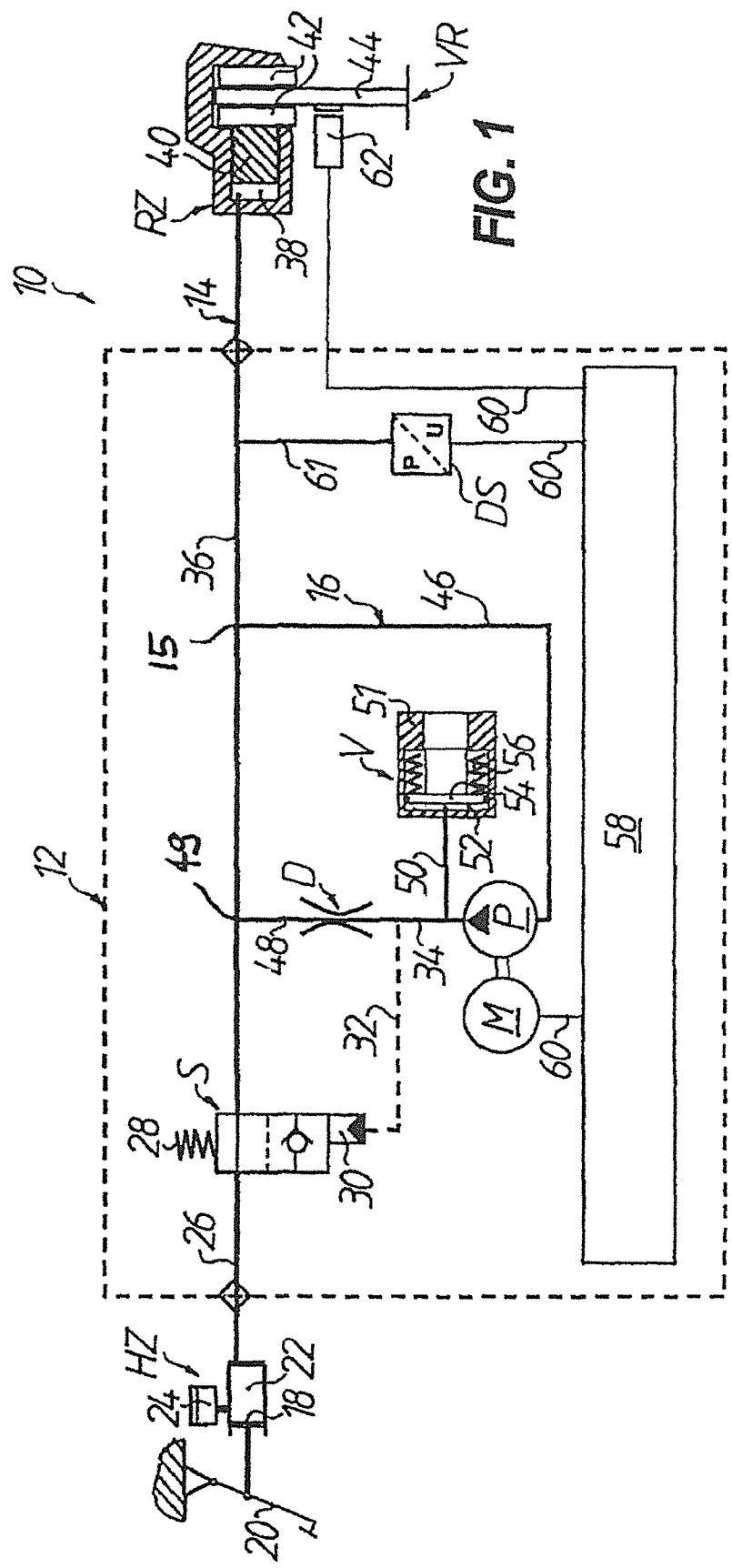
FIG. 1 shows a circuit diagram of an anti-lock hydraulic braking system for a motorized two-wheel vehicle according to a first example of embodiment of the invention (1-channel ABS), wherein only the front wheel brake circuit is shown, while the uncontrolled rear wheel brake circuit is not shown since it does not differ from conventional rear wheel brake circuits.

In FIG. 1, an anti-lock hydraulic braking system for a motorized two-wheel vehicle is generally denoted by 10, of which only the part of the system which acts on the front wheel VR is shown. The braking system includes a main brake cylinder HZ and a wheel brake cylinder RZ and also a pressure modulator which is connected therebetween and is generally denoted by 12. Seen hydraulically, the part of the braking system 10 which acts on the front wheel VR can be divided into a wheel brake circuit 14, which includes the main brake cylinder HZ, the wheel brake cylinder RZ and a switching valve S connected therebetween, and an auxiliary pressure circuit 16 which is connected in parallel from a first hydraulic connection point 49 to a second hydraulic connection point 15 between the switching valve S and the wheel brake cylinder RZ on the wheel brake circuit 14. The auxiliary pressure circuit 16 generally includes the first hydraulic connection point 49 located downstream of a hydraulic pump P on the auxiliary pressure circuit for producing a volume flow, a throttle device D which is arranged downstream of the hydraulic pump P, and a volume equalization device V. As will be explained in more detail below, the switching valve S, for a skid-controlled operating phase of the braking system 10 (case of ABS control), can be switched from a basic position, in which it hydraulically connects the main brake cylinder HZ and the wheel brake cylinder RZ, to a switched position in which it prevents a build-up of braking pressure on the wheel brake cylinder RZ via the main brake cylinder HZ, while the braking pressure on the wheel brake cylinder RZ can be modulated by means of the auxiliary pressure circuit 16. What is essential here, as will also be described in more detail below, is that the volume equalization device V is connected between the hydraulic pump P and the throttle device D on the auxiliary pressure circuit 16, wherein the volume flow produced by the hydraulic pump P can be varied in order to withdraw hydraulic fluid from the wheel brake circuit 14 in a defined manner.

For the hydraulic actuation of the part of the braking system 10 which acts on the front wheel VR, use is made of the single-chamber main brake cylinder HZ, the piston 18 of which can be displaced by means of an actuating element 20—shown schematically here as a pedal but usually designed as a lever—in order to produce a braking pressure in a pressure chamber 22 which is connected to an equalization container 24 in the illustrated, non-actuated state of the main brake cylinder HZ. The pressure connection of the pressure chamber 22 is connected via a pressure line 26 to a pressure connection of the switching valve S.

The switching valve S is a 2/2-way valve which is biased by a valve spring 28 into a throughflow zero position and can be actuated hydraulically via a control connection 30, which valve in its switched position acts as a non-return valve which on the one hand allows a reduction in braking pressure on the wheel brake cylinder RZ via the main brake cylinder HZ but on the other hand blocks anything coming from the main brake cylinder HZ towards the wheel brake cylinder RZ. The switching valve S can be switched from its basic or zero position to its switched position as a function of the pressure prevailing between the hydraulic pump P and the throttle device D in the auxiliary pressure circuit 16, for which purpose the control connection 30 is connected via a control line 32 to the corresponding dynamic pressure section 34 of the auxiliary pressure circuit 16. The valve spring 28 is designed here in such a way that the switching valve S switches from its basic or zero position to its switched position only in the event of a locking pressure at the control connection 30. This locking pressure is a predetermined pressure, i.e. a pressure defined by the design, which, if this pressure were to be applied to the wheel brake cylinder RZ, would lock the braked wheel, here the front wheel VR, under the worst conditions (maximum loading of the vehicle) at high friction coefficients (high μ).

The working connection of the switching valve S is hydraulically connected via a pressure line 36 to the pressure connection of the wheel brake cylinder RZ. The wheel brake cylinder RZ, which in the illustrated example of embodiment is integrated in a brake caliper or more specifically a floating caliper of a disc brake, has a pressure chamber 38 which is delimited in a hydraulically leaktight manner by a piston 40 which is guided in a longitudinally displaceable manner in the floating caliper. Furthermore, the floating caliper is provided with brake linings 42 which, in a manner known per se, are pressed against a brake disc 44 when the pressure chamber 38 is subjected to pressure via the piston 40.

Connected in parallel to the pressure line 36 is the auxiliary pressure circuit 16 in which the hydraulic pump P, the volume equalization device V and the throttle device D are arranged one behind the other in series in this order. More specifically, a suction section 46 of the auxiliary pressure circuit 16 branches off from the pressure line 36 at a second hydraulic connection point 15 and is connected to the suction side of the hydraulic pump P, i.e. upstream of the pump on the auxiliary pressure circuit between the first hydraulic connection point 49 and the wheel brake cylinder RZ. The pressure side of the hydraulic pump P is connected via the dynamic pressure section 34 of the auxiliary pressure circuit 16 to the input of the throttle device D, which is preferably a fixed baffle and the output of which is in turn connected via a connecting section 48 of the auxiliary pressure circuit 16 to the pressure line 36.

The hydraulic pump P, which is preferably a roller cell pump, can be driven by an electric motor M which is preferably a brushless DC motor. In order to control the conveying power of the hydraulic pump P, i.e. in order to vary the volume flow produced by the hydraulic pump P, the rotational speed of the electric motor M is controllable.

The volume equalization device V is connected via an equalization line 50 to the dynamic pressure section 34 of the auxiliary pressure circuit 16. In the illustrated example of embodiment, the volume equalization device V is a spring pressure reservoir, with a housing 51 ventilated from behind, an equalization chamber 52 provided therein which is hydraulically connected to the equalization line 50, a piston 54 which is guided in a longitudinally displaceable manner in the housing 51 and which delimits the equalization chamber 52 in a hydraulically leaktight manner, and a pressure spring 56 which is arranged in the housing 51 and which biases the piston 54 in the direction of the equalization chamber 52. The pressure spring 56 is designed here in such a way that the piston 54 moves to the right in FIG. 1 and therefore the volume equalization device V "reacts" and receives hydraulic fluid only when the locking pressure defined above is present on the volume equalization device V via the equalization line 50.

In FIG. 1, 58 denotes control electronics. Connected to the control electronics 58, via electrical lines generally denoted by 60, are the electric motor M for driving the hydraulic pump P, a pressure sensor DS, by means of which the braking pressure in the pressure line 36 can be detected via a hydraulic signal line 61, and a speed or rotational speed sensor 62 for detecting the rotational speed of the corresponding wheel, here the front wheel VR.

Finally, the structure of the braking system 10 is indicated by the system boundary of the pressure modulator 12 which is shown in dashed line in FIG. 1, such that all the above-described components, apart from the main brake cylinder HZ, the wheel brake cylinder RZ and the rotational speed sensor 62, can be combined to form a block so that the pressure modulator 12 designed in this way can be provided as a pre-assembled, functionally checked unit that has optionally been pre-filled with hydraulic fluid to allow uncomplicated installation by the motor vehicle manufacturer. In such a housing block, the above-described hydraulic lines can of course also be formed as hydraulic channels, which connect together as described the hydraulic components, switching valve S, hydraulic pump P, volume equalization device V, throttle device D, mounted onto the housing block.

The above-described hydraulic braking system 10 operates as follows. In the normal braking mode, i.e. when there is no ABS control, the switching valve S is in its throughflow zero position shown in FIG. 1. When the main brake cylinder HZ is then actuated via the actuating element 20, the connection between the pressure chamber 22 and the equalization container 24 is interrupted due to the displacement of the piston 18, and a pressure builds up in the pressure chamber 22. Via the pressure line 26, the open switching valve S and the pressure line 36, this pressure reaches the pressure chamber 38 of the wheel brake cylinder RZ and causes a displacement of the piston 40 therein, as a result of which the front wheel VR is braked in a manner known per se by the brake linings 42 and the brake disc 44. When the actuating element 20 is released in order to end the braking process, the braking pressure on the wheel brake cylinder RZ is reduced again in the same way via the pressure line 36, the open switching valve S and the pressure line 26 to the main brake cylinder HZ.

In the case of ABS control, which is detected in a manner known per se by the control electronics 58 in the course of a braking process initiated as described above when the evaluation of the signal from the rotational speed sensor 62 shows that the front wheel VR is being excessively braked, i.e. a predefined slowing threshold is being exceeded on the front wheel VR, the control electronics 58 switches the electric motor M to a relatively high rotational speed so that the hydraulic pump P starts to convey hydraulic fluid out of the suction section 46 of the auxiliary pressure circuit 16 with a relatively high conveying power. In the process, a dynamic pressure is produced in front of the throttle device D in the dynamic pressure section 34 of the auxiliary pressure circuit 16, which dynamic pressure is applied both in the equalization chamber 52 of the volume equalization device V via the equalization line 50 and to the control connection 30 of the switching valve S via the control line 32.

When the locking pressure (already described above) is reached in the dynamic pressure section 34 of the auxiliary pressure circuit 16, the switching valve S switches from its basic or zero position to its switched position counter to the force of the valve spring 28, so that a further increase in the braking pressure in the pressure line 36 via the main brake cylinder HZ is no longer possible. Due to the non-return valve function of the switching valve S in its switched position, however, it is possible for the driver of the motorized two-wheel vehicle to deliberately reduce the braking pressure in the pressure line 36 by releasing the actuating element 20.

At the same time, the reaction pressure of the volume equalization device V is reached in the equalization chamber 52, whereupon the piston 54 is displaced to the right in the housing 51 counter to the force of the pressure spring 56 in FIG. 1 and the volume equalization device V receives hydraulic fluid. As a result of this withdrawal of hydraulic fluid from the pressure line 36 into the volume equalization device V, which is brought about by the hydraulic pump P via the suction section 46 of the auxiliary pressure circuit 16, and due to the fact that hydraulic fluid cannot continue to flow to the same extent in the pressure line 36 via the throttle device D and the connecting section 48 of the auxiliary pressure circuit 16, a reduction in braking pressure on the wheel brake cylinder RZ is obtained. As a result, the front wheel VR turns more quickly again.

If the evaluation of the signal from the rotational speed sensor 62 by the control electronics 58 shows that a second slowing threshold is being undershot on the front wheel VR, the control electronics 58 reduces the rotational speed of the electric motor M, whereupon the conveying power of the hydraulic pump P decreases. As a result, the dynamic pressure in front of the throttle device D in the dynamic pressure section 34 of the auxiliary pressure circuit 16 is reduced, whereupon the piston 54 of the volume equalization device V is displaced to the left in FIG. 1 due to the force of the pressure spring 56 and thus pushes hydraulic fluid out of the volume equalization device V. The hydraulic fluid passed back via the equalization line 50 into the dynamic pressure section 34 of the auxiliary pressure circuit 16 passes via the throttle device D and the connecting section 48 of the auxiliary pressure circuit 16 back into the pressure line 36. As a result, the braking pressure on the wheel brake cylinder RZ increases again, namely until the first slowing threshold on the front wheel VR is exceeded, whereupon the procedure described above for reducing the pressure on the wheel brake cylinder RZ is repeated.

It can be seen that, at a fast speed of the electric motor M and with a relatively high conveying power of the hydraulic pump P, a relatively large volume of hydraulic fluid can be withdrawn from the wheel brake circuit 14, which leads to a relatively pronounced reduction in pressure on the wheel brake cylinder RZ, whereas at a slower speed of the electric motor M and with a relatively low conveying power of the hydraulic pump P, a smaller volume of hydraulic fluid can be withdrawn from the wheel brake circuit 14, which leads to a less pronounced reduction in pressure on the wheel brake cylinder RZ. In order to increase the pressure on the wheel brake cylinder RZ, by suitably controlling the rotational speed of the electric motor M, the conveying power of the hydraulic pump P need only be reduced far enough that the dynamic pressure in the dynamic pressure section 34 of the auxiliary pressure circuit 16 is reduced to such an extent that the volume equalization device V at least partially discharges again the volume of hydraulic fluid withdrawn from the wheel brake circuit 14, which hydraulic fluid then passes back, with a time delay, via the throttle device D into the wheel brake circuit 14. As a result, by suitably actuating the electric motor M and thus the hydraulic pump P in collaboration with the throttle device D and the volume equalization device V, the hydraulic pressure in the wheel brake circuit 14 can be reduced, maintained or increased in a defined manner as described above. The actual ABS control algorithm, which comprises predefined pressure increase, pressure maintenance and pressure reduction phases, does not differ from conventional ABS control algorithms and therefore will not be described in any greater detail at this point.

Once there is no longer any threat of locking of the front wheel VR, the rotational speed of the electric motor M is considerably reduced by the control electronics 58 at the end of the ABS control process, as a result of which the conveying power of the hydraulic pump P and thus the dynamic pressure in front of the throttle device D in the dynamic pressure section 34 of the auxiliary pressure circuit 16 are considerably reduced. As a result, the entire volume of hydraulic fluid received by the volume equalization device V is pushed back into the dynamic pressure section 34 of the auxiliary pressure circuit 16 by the piston 54 subjected to force by the pressure spring 56, which hydraulic fluid passes back into the wheel brake circuit 14 via the throttle device D and the connecting section 48 of the auxiliary pressure circuit 16. In the process, the dynamic pressure in the dynamic pressure section 34 of the auxiliary pressure circuit 16 is reduced via the throttle device D to such an extent as to again fall below the locking pressure in the dynamic pressure section 34. The switching valve S is then finally switched back from its switched position to the basic or zero position under the force of the valve spring 28, whereupon the control electronics 58 stops the electric motor M, which runs continuously during ABS control but at varying rotational speeds, and thus the hydraulic pump P.

It should also be mentioned that the pressure sensor DS in the case of ABS control serves in particular to prevent the situation whereby a negative pressure is generated on the wheel brake cylinder RZ by the hydraulic pump P of the auxiliary pressure circuit 16.

Figure 2:
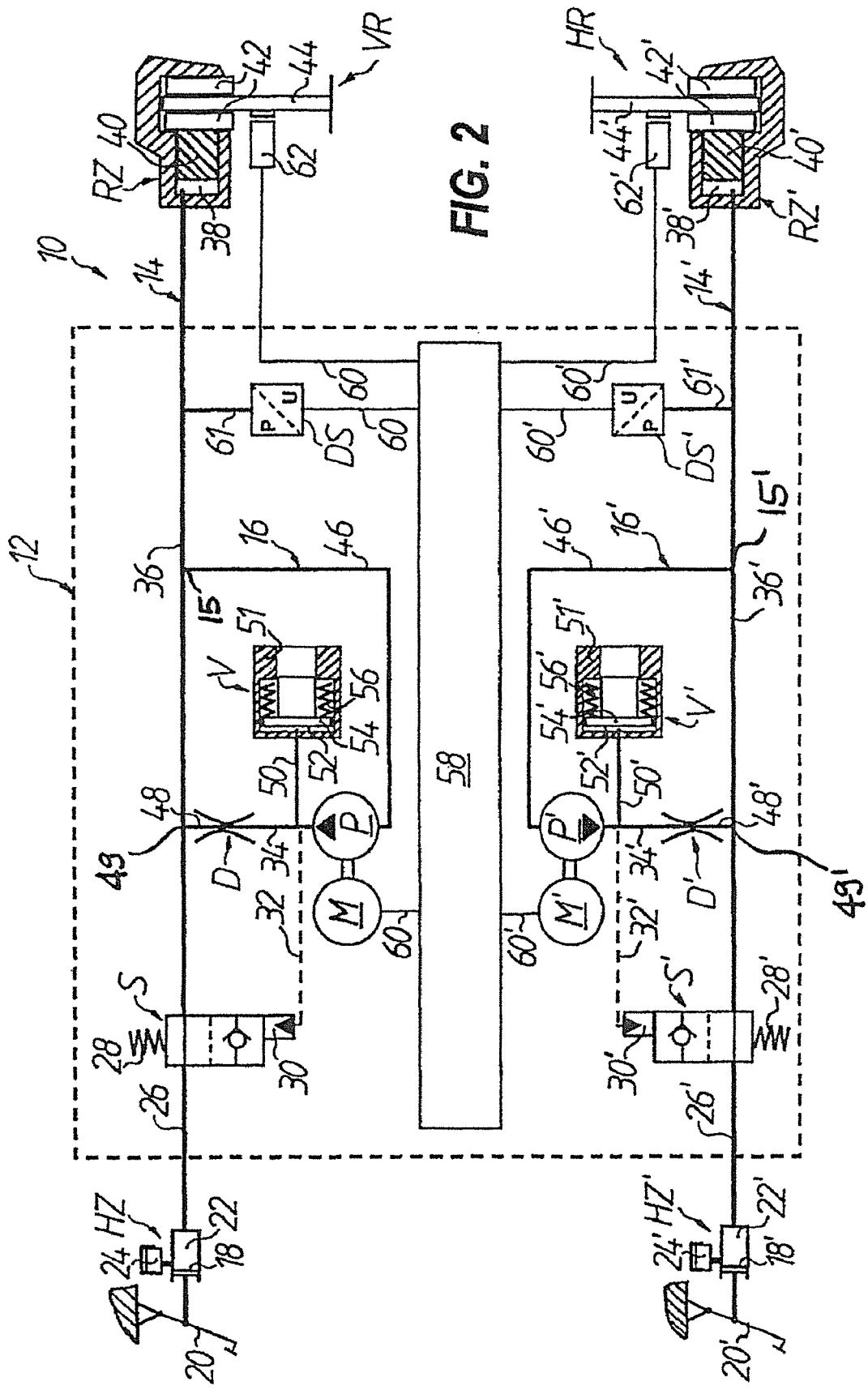
FIG. 2 shows a circuit diagram of an anti-lock hydraulic braking system for a motorized two-wheel vehicle according to a second example of embodiment of the invention (2-channel ABS), wherein the front wheel and rear wheel brake circuits are shown.

FIG. 2 shows a second example of embodiment which illustrates how a 2-channel ABS can be constructed with the above-described hydraulic circuit, wherein, compared to the 1-channel ABS shown in FIG. 1, identical or corresponding components are marked with the same references and are provided with an additional prime symbol (') in the case of the wheel brake circuit 14' and the auxiliary pressure circuit 16' for the rear wheel HR. The braking processes on the front wheel VR and rear wheel HR, particularly in the case of ABS control, in principle do not differ from the mode of operation described above in relation to the 1-channel ABS, and therefore they do not need to be further described at this point. All that should be mentioned here is the fact that in principle a certain braking force distribution on the front wheel VR and rear wheel HR can be defined by the common control electronics 58 for the brakes on the front wheel VR and rear wheel HR if both brakes are in ABS control.

In summary, an anti-lock hydraulic braking system is disclosed, comprising a wheel brake circuit which comprises a main brake cylinder, a wheel brake cylinder and a switching valve, and an auxiliary pressure circuit which is connected in parallel between the switching valve and the wheel brake cylinder on the wheel brake circuit and which comprises a hydraulic pump, a throttle device arranged downstream thereof, and also a volume equalization device. In the case of ABS control, the switching valve can be switched from a basic position, in which it hydraulically connects the main brake cylinder and the wheel brake cylinder, to a switched position in which it prevents a build-up of braking pressure on the wheel brake cylinder via the main brake cylinder, while the braking pressure on the wheel brake cylinder can be modulated by means of the auxiliary pressure circuit. The volume equalization device is connected between the hydraulic pump and the throttle device on the auxiliary pressure circuit, wherein the volume flow produced by the hydraulic pump can be varied in order to withdraw hydraulic fluid from the wheel brake circuit in a defined manner. As a result, a braking system is provided which is simpler and less expensive than the prior art and which, in the case of ABS control, is free of disruptive feedback effects on the main brake cylinder.

Other variations and modifications are possible without departing from the scope and spirit of the present invention as defined by the appended claims.

I claim:

1. An anti-lock hydraulic braking system for two-wheel vehicles, comprising:
   a wheel brake circuit which comprises a main brake cylinder, at least one wheel brake cylinder and a switching valve therebetween; and
   an auxiliary pressure circuit which is connected in parallel between the switching valve and the wheel brake cylinder on the wheel brake circuit via first and second hydraulic connection points and which comprises a hydraulic pump for producing a volume flow, a throttle device arranged downstream of the hydraulic pump, and a volume equalization device that is connected between the hydraulic pump and the throttle device on the auxiliary pressure circuit;
   said first hydraulic connection point being located downstream of the hydraulic pump between the switching valve and the second hydraulic connection point, said second hydraulic connection point being located upstream of the hydraulic pump on the auxiliary pressure circuit between the first hydraulic connection point and the wheel brake cylinder, and said wheel brake circuit being free of any electromagnetic operated switching valve between said first hydraulic connection point and said wheel brake cylinder;
   the braking system being provided with an anti-lock operating phase;
   the switching valve being positioned upstream from the first hydraulic connection point on the wheel brake circuit, having a basic position, in which it hydraulically connects the main brake cylinder and the wheel brake cylinder, and a switched position, into which it switches from the basic position in the anti-lock operating phase and in which it prevents a build-up of a braking pressure on the wheel brake cylinder via the main brake cylinder, while the braking pressure on the wheel brake cylinder can be modulated by the auxiliary pressure circuit;
   the wheel brake circuit downstream of said first hydraulic connection point and the auxiliary pressure circuit both being free of any electromagnetically operated switching valve; and
   wherein the hydraulic pump is constructed to vary the volume flow so that by changing in a defined manner the conveying power of the hydraulic pump which, in the anti-lock operating phase, is operated continuously, hydraulic fluid can be withdrawn from the wheel brake circuit in a defined manner and thus the brake pressure can be modulated in the anti-lock operating phase without any electromagnetically operated switching valve.

2. A braking system according to claim 1, wherein the volume equalization device is a spring pressure reservoir.

3. A braking system according to claim 1, wherein the throttle device is a fixed baffle.

4. A braking system according to claim 1, wherein the hydraulic pump can be driven by means of an electric motor, with a rotational speed that can be controlled in order to vary the volume flow produced by the hydraulic pump.

5. A braking system according to claim 4, wherein the hydraulic pump is a roller cell pump.

6. A braking system according to claim 4, wherein the electric motor is a brushless DC motor.

7. A braking system according to claim 1, wherein the switching valve can be switched from its basic position into its switched position as a function of pressure prevailing between the hydraulic pump and the throttle device in the auxiliary pressure circuit.

8. A braking system according to claim 1, wherein the switching valve in its switched position acts as a non-return valve which allows a reduction in braking pressure on the wheel brake cylinder via the main brake cylinder.

9. A braking system according claim 1, comprising a pressure sensor, which detects the braking pressure in the wheel brake circuit.

10. A braking system according to claim 1, wherein at least the switching valve, the hydraulic pump, the throttle device and the volume equalization device are combined to form a block as pressure modulator.

* * * * *